Dec. 20, 1960  J. E. WHELAN  2,965,391
TWO-POSITION AIR SUSPENSION CONTROL VALVE
Filed Dec. 11, 1958  2 Sheets-Sheet 1

INVENTOR.
James E. Whelan
BY
*Q. C. Staley*
HIS ATTORNEY

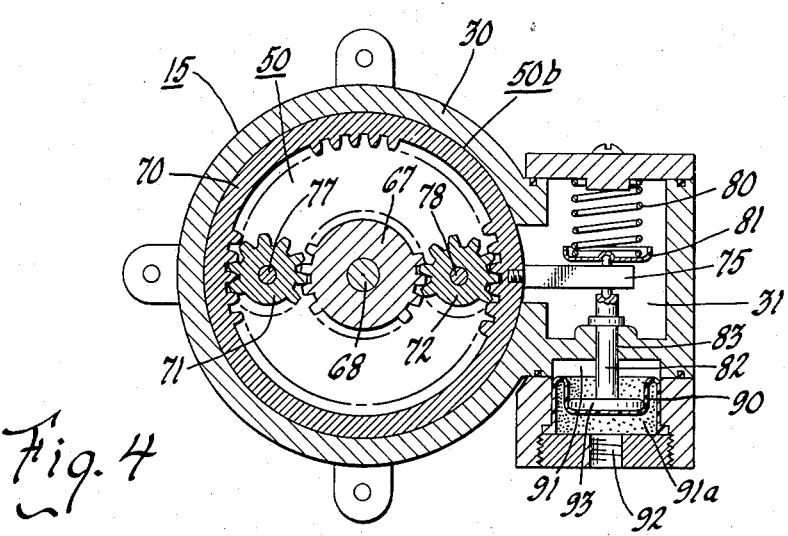
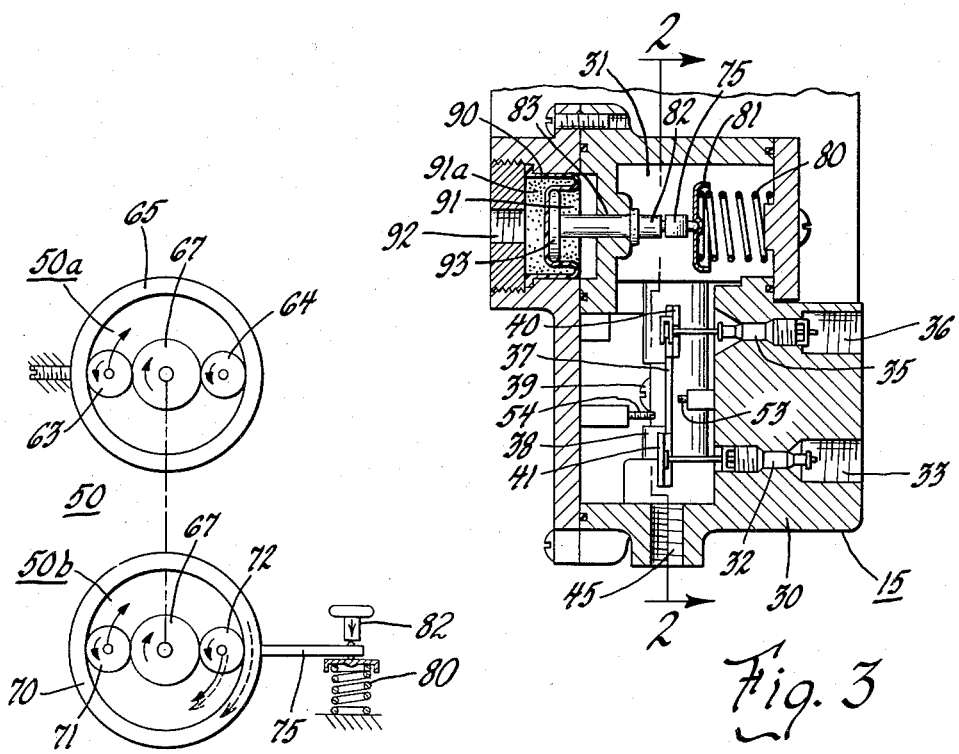

United States Patent Office 2,965,391
Patented Dec. 20, 1960

2,965,391

TWO-POSITION AIR SUSPENSION CONTROL VALVE

James E. Whelan, Dayton, Ohio, assignor to General Motors Corporation, Detroit, Mich., a corporation of Delaware Filed Dec. 11, 1958, Ser. No. 779,746

10 Claims. (Cl. 280—124)

This invention relates to control valves adapted to regulate the supply and exhaust of air to and from an air spring of an air suspension system to regulate the clearance height between the sprung mass and the unsprung mass of a vehicle to establish and maintain a relatively predetermined clearance height between the sprung mass and the unsprung mass.

The use of air springs to replace conventional steel springs between the sprung mass and the unsprung mass of a vehicle to support the chassis and body of the vehicle upon a running gear is now well known in the art. These air springs consist of an expansible chamber that receives air under pressure of a value suitable to support the chassis of a vehicle upon the running gear, utilizing the air of the air spring as the resilient means for supporting the body upon the running gear of the vehicle.

To establish a predetermined clearance height between the sprung mass, that is the body of the vehicle, and the unsprung mass, that is the running gear of the vehicle, the air springs receive air under pressure from a suitable source of pressure supply on the vehicle sufficient to support the load of the body upon the running gear at a predetermined clearance height relative to the running gear.

To maintain the clearance height between the sprung mass and the unsprung mass at a relatively constant value, control valves are provided for regulating the air under pressure to the air springs and exhausting air from the air springs in response to a change in clearance height between the sprung mass and the unsprung mass of the vehicle. These control valves are conventionally carried by the chassis or body of the vehicle with suitable linkage connecting the control valves with the running gear of the vehicle so that internal valve mechanism within the control valve will be actuated upon a change of clearance height between the body and the running gear of the vehicle to supply air to the air springs when the predetermined clearance height is decreased for any reason, such as an increase of load in the body of the vehicle, or loss of air from the air springs. Similarly, the control valves exhaust air from the air springs when the load within the vehicle is decreased, whereby a relatively constant clearance height is established between the chassis of the vehicle and the running gear.

There are conditions, however, under which a predetermined clearance height between the body and running gear of the vehicle is not satisfactory to meet the particular condition, such as when placing the vehicle on a grease rack of an old-style type, or when operating the vehicle over highly crowned or rutted roads. The low road clearance given to modern vehicles creates this problem, which is somewhat amplified by vehicles using air suspension systems because of the tendency to decrease the clearance height between the sprung mass and the unsprung mass of the vehicle when using air suspension, since it is possible with an air suspension system to maintain the clearance height relatively constant under any load condition. This is in distinction from the use of a high clearance height under a light load condition so that there will still be satisfactory clearance height between the sprung mass and the unsprung mass under a fully loaded condition of the vehicle, such as is conventional with the use of ordinary steel springs.

While under ordinary road conditions it is possible to maintain one predetermined clearance height of the vehicle using air spring suspension systems at a relatively low road clearance, yet it is desirable under conditions previously mentioned to be able to increase the clearance height or road clearance of the vehicle, at least temporarily, and operate the vehicle at this increased clearance height until the difficult condition has been avoided or eliminated. It is, therefore, desirable to have a control valve for regulating the supply and exhaust of air to and from an air spring that is capable of establishing and maintaining one predetermined clearance height between the sprung mass and the unsprung mass of a vehicle when operating under normal road conditions, that is road conditions which allow for a relatively low road clearance, and to be able to increase the clearance height or road clearance of the vehicle under adverse road conditions, or when placing the vehicle on a grease rack. Such a temporary increase in clearance height is also desirable when changing a tire in order to lift the body of the vehicle to a height above normal clearance height.

It is, therefore, an object of this invention to provide a control valve for regulating the supply and exhaust of air to and from an air spring of an air suspension system wherein the control valve is constructed and arranged to provide for establishing and maintaining more than one clearance height value between the sprung mass and the unsprung mass of a vehicle so as to increase the road clearance of the vehicle when desired.

It is still another object of the invention to provide a control valve for regulating the supply and exhaust of air to and from an air spring of an air suspension system wherein the control valve is provided with two selective operating positions which establish and maintain two values of predetermined clearance height between the sprung mass and the unsprung mass of the vehicle, the operator of the vehicle having control over the control valve to position it in one or the other of its selective positions and to be able to return the control valve to either of its previous selective positions after being changed from one to the other.

It is another object of the invention to provide a control valve for regulating the supply and exhaust of air to and from an air spring wherein a planetary gear system is used to transmit mechanical motion from an oscillating member that responds to movements between the sprung mass and the unsprung mass of the vehicle to an oscillating member that opens and closes the inlet and exhaust valves of the control valve, the planetary gear system being arranged in a manner that actuation of the planetary gear system from a source outside the valve will change the operating characteristics of the control valve in a manner that the control valve will establish and maintain a second and different predetermined clearance height between the sprung mass and the unsprung mass of the vehicle from an original predetermined clearance height that is normally maintained for the vehicle when operating over normal road conditions, the second predetermined clearance height being one that is greater than the normal clearance height to provide for extra clearance between the sprung mass and the unsprung mass of the vehicle.

Further objects and advantages of the present invention will be apparent from the following description, reference being had to the accompanying drawings wherein preferred embodiments of the present invention are clearly shown.

In the drawings:

Fig. 3 is a cross-sectional view taken along line 3—3 of Fig. 2.

Fig. 4 is a cross-sectional view taken substantially along line 4—4 of Fig. 2.

Fig. 5 is a schematic view of the planetary gear system of the valve illustrated in Fig. 2 showing directions of rotation of the components of the two planet systems.

Fig. 1 illustrates schematically a vehicle incorporating an air suspension system with the sprung mass of the vehicle being supported upon the running gear or axle structure of the vehicle by means of air springs, the air springs being under control or regulation of a control valve adapted to respond to changes in clearance height between the sprung mass and the unsprung mass of the vehicle.

Figure 1:
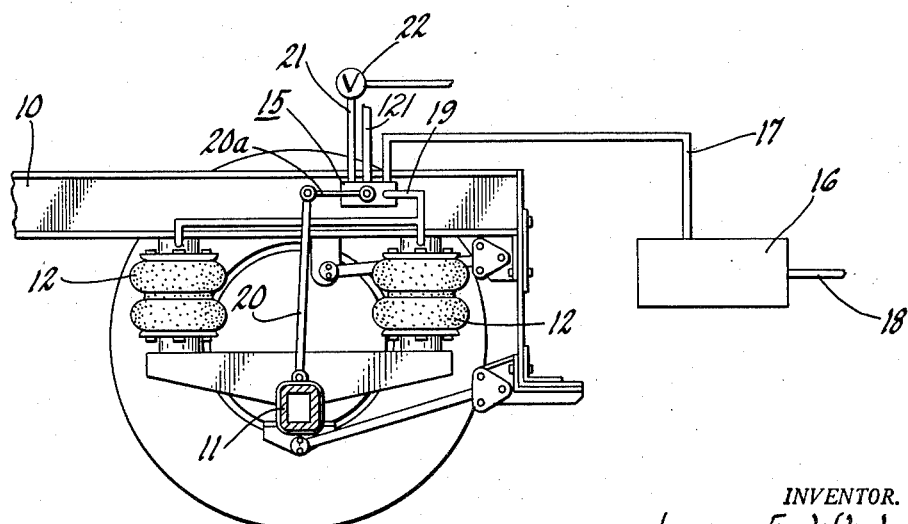
Fig. 1 is a schematic illustration of an air suspension system on a vehicle incorporating a control valve constructed and arranged in accordance with this invention.

In the schematic illustration of Fig. 1, the vehicle consists of a chassis frame 10, or sprung mass, that is supported upon the axle structure 11, or unsprung mass of the vehicle, by means of the air springs 12. The air springs 12 are preferably expansible bellows type of units adapted to receive air under pressure sufficient to normally support the load of the chassis 10 upon the axle structure 11. When the load in the sprung mass, that is chassis of the vehicle is increased, air under pressure is supplied to the air springs 12 to offset the increase in load and thereby maintain the clearance height between the sprung mass and the unsprung mass at a relatively constant value. Similarly, when the load in the vehicle decreases, air is exhausted from the air springs 12 to again compensate for the loss of load to maintain the clearance height at the relatively constant value.

The clearance height between the sprung mass 10 and the unsprung mass 11 is regulated and established by means of air control valve 15 that is carried on the chassis 10 of the vehicle. The control valve 15 is provided with an inlet valve member that connects with a source of reservoir pressure maintained in the reservoir 16, a line 17 connecting the reservoir with the control valve 15. Reservoir pressure of a predetermined value is maintained in the reservoir by operation of an air compressor (not shown) normally operated by the engine of the vehicle, the air under pressure being supplied through the line 18 to the reservoir 16.

The control valve 15 is connected with the air springs 12 by means of a supply line 19 through which air under pressure is supplied to the air springs when the air inlet valve in the control valve 15 is actuated by the linkage 20 connecting the valve 15 with the axle 11 of the vehicle. Thus, when the load in the vehicle increases tending to compress the air springs 12, the linkage 20 will operate the inlet valve member of the control valve 15 to supply additional air under pressure to the springs 12 and thereby compensate for the increase in load. Similarly, when the load decreases in the vehicle, the linkage 20 operates an exhaust valve member in the control valve 15 to allow air under pressure to exhaust through the line 121 and thereby maintain the clearance height between the sprung mass and the unsprung mass at a relatively constant value.

Control or regulating valves supplying air to an air spring and exhausting air therefrom in response to changes in clearance height between the sprung mass and the unsprung mass of the vehicle are relatively well known in the art, such valves being adapted to maintain one selected predetermined clearance height between the sprung mass and the unsprung mass of the vehicle.

However, the control valve 15 of this invention is constructed and arranged in a manner that it has two selective positions in which it can maintain clearance height values between the sprung mass and the unsprung mass that are different, depending upon the selective operating positions of the control valve. The control valve 15 of this invention is adapted to be under control of the operator of the vehicle so that the operator can selectively determine the clearance height to be established by the control valve.

To change the control valve in a manner to have its operating characteristics changed, a planetary gear system is provided between the actuating linkage 20 and the inlet and exhaust valve operating mechanism to transmit the mechanical movement of the linkage system 20 to the inlet and exhaust valves to open and close the same. The planetary gear system, described more fully hereinafter, may be actuated by the operator of the vehicle to change the operating characteristics of the control valve 15 by supplying air under pressure through the line 21 to a fluid actuated mechanism in the valve 15 that changes the position of the components of the planetary gear system and thereby effects a change in the operating characteristics of the control valve so that it will establish and maintain a second predetermined clearance height above that normally maintained by the valve. This second predetermined clearance height will be maintained at a constant value by the control valve 15 so long as air under pressure is delivered through the line 21 to the fluid actuated device in the control valve.

Air under pressure to the line 21 is controlled by a manually actuated valve 22 that is under control of the operator in the vehicle, an air supply line being provided to supply the fluid pressure to actuate the fluid device in the control valve 15.

As more particularly shown in Figs. 2 to 5 inclusive, the control valve 15 consists of a valve casing or housing 30 forming a valve chamber 31 that contains the operating mechanism of the control valve.

The control valve has an inlet valve 32 placed in an inlet port 33 that connects with the supply line 17 from the reservoir 16. This valve 32 is of a conventional tire-type valve construction and is normally closed against entry of air into the chamber 31 from the port inlet 33. A second valve 35 forms an exhaust valve for escape of air under pressure from the chamber 31 to atmosphere or exhaust through the port 36. This valve 35 is also a conventional tire-type valve construction and is normally closed against exhaust of air from the chamber 31 to the exhaust port 36 or to atmosphere.

These inlet and exhaust valves 32 and 35 are opened and closed by a valve member 37 that is carried on an oscillatable shaft 38, the member 37 being fixed to the shaft by a suitable screw 39. The valve operating member 37 has two legs 40 and 41, the leg 40 engaging the stem of the exhaust valve 35 while the leg 41 engages the stem of the inlet valve 32. It will be seen from Fig. 3 that rightward movement of the member 37 will open the inlet valve 32 to allow air under pressure to enter into the chamber 31 from which it flows through the port outlet 45 to the air springs 12 through the line 19 (see Fig. 1). Similarly, leftward movement of the member 37, as viewed in Fig. 3, will open the exhaust valve 35 to allow air under pressure to escape from the air springs 12 back through chamber 31 and through the exhaust port 36 to atmosphere.

From the foregoing description, it will be apparent that controlled oscillation of the shaft 38 in response to changes in clearance height between the sprung mass and the unsprung mass of the vehicle will open and close the inlet and exhaust valves 32 and 35 to maintain a predetermined clearance height between the sprung mass and the unsprung mass of the vehicle.

Figure 2:
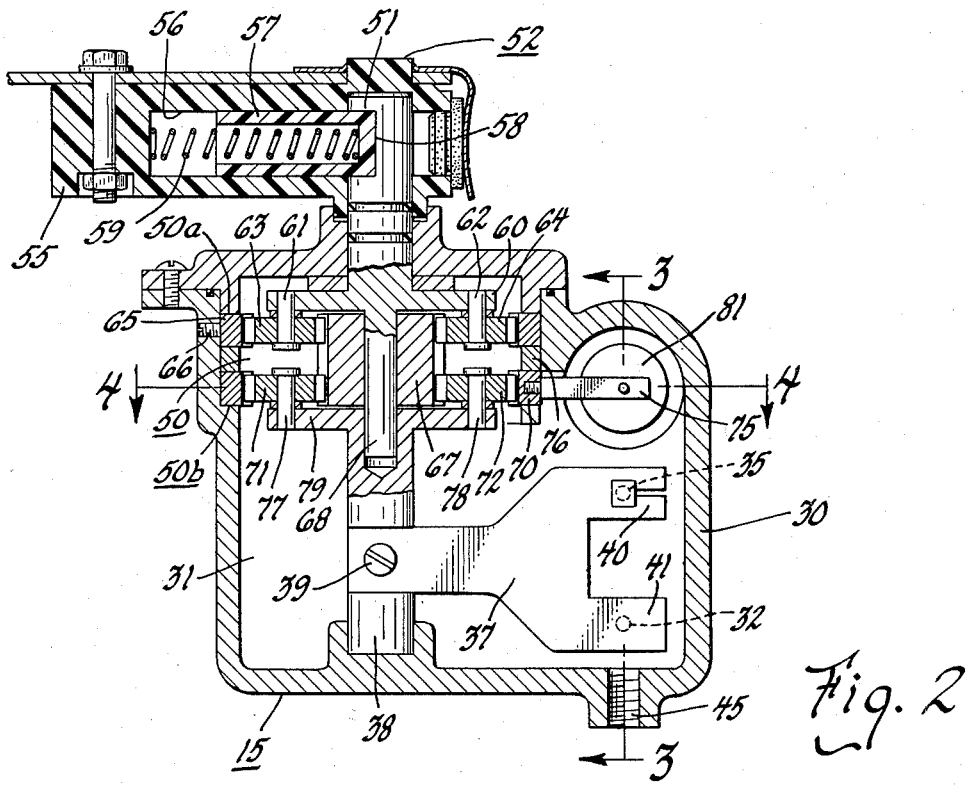
Fig. 2 is a cross-sectional view of the control valve of this invention taken substantially along line 2—2 of Fig. 3.

The valve operating shaft 38 is oscillated by means of a planetary gear system 50 that includes the planet systems 50a and 50b. The planetary gear system 50 transmits oscillations of the actuating shaft 51 to the valve operating shaft 38, shafts 38 and 51 being in axial alignment as shown in Fig. 2. The actuating shaft 51 is connected to the lever 20a that forms a part of a linkage system 20 between the axle 11 of the vehicle and the control valve so that the control valve responds to changes in clearance height between the chassis 10 and the axle 11 of the vehicle.

Lever arm 20 is secured to an overtravel mechanism 52 that allows the lever 20a to move a greater arcuate distance than is allowed the valve operating arm 37 working between the adjustable stops 53 and 54. The overtravel mechanism 52 is required to absorb the greater axle movement.

This overtravel mechanism consists of a body member 55 that has a cylinder bore 56 carrying a piston 57 urged against a flat portion 58 on the shaft 51 by means of the compression spring 59. It is apparent that when the shaft 51 is prevented from movement by controlled movement of the member 37, the excess of movement of the axle of the vehicle will be taken by movement of the piston 57 inwardly against the spring 59.

The oscillatable actuating shaft 51 has a radial extension 60 located in chamber 31 of the valve housing 30. This radial extension 60 carries the stub shafts 61 and 62 that, in turn, carry the planet gears 63 and 64 respectively. The planet gears 63 and 64 engage the stationary ring gear 65 held stationary by the set screw 66. These planet gears 63 and 64 also engage a sun gear 67 that is supported on the small diameter extension 68 on the end of the shaft 51, the sun gear 67 being freely rotatable on the shaft extension 68.

Thus, the ring gear 65, the planet gears 63 and 64, and the sun gear 67, specifically the upper end of the sun gear, form the planet system 50a of the planetary system 50. A second planet system 50b includes the ring gear 70 engaged by the planet gears 71 and 72 and the lower end of the sun gear 67.

The ring gear 70 is rotatable in the valve housing 30 and has a radial extension 75 provided to effect rotation of the ring gear 70 relative to the ring gear 65. A spacer member 76 is provided between the ring gears 65 and 70.

The planet gears 71 and 72 of the second planet system 50b are carried on the stub shafts 77 and 78 that, in turn, are carried on the radial extension 79 on the end of the valve operating shaft 38.

The radial extension 75 on the ring gear 70 is normally held in a fixed or stationary position by means of a compression spring 80 (see Fig. 4), urging the retainer 81 against one side of the member 75 to hold it in position against the operating stud shaft 82 that is slidably journaled in the bore 83 of the valve housing 30. In the control valve thus far described, assuming the load in the vehicle to be increased, the valve housing 30 being attached to the chassis 10 will move downwardly, that is it will move away from the viewer when looking at the drawing (see Fig. 2). Since the axle 11 is, in effect, stationary at this time, the arm 20a will move upwardly, that is toward the viewer. This upward movement of the arm 20a will rotate the valve actuating shaft 51 in a clockwise direction (as viewed from the upper end of Fig. 2), which, in turn, will rotate the radial extension 60 thereof in a clockwise direction and thereby carry the planet gears 63 and 64 in a clockwise direction about the axis of the small diameter shaft 68. This clockwise motion of the planet gears 63 and 64 will cause clockwise movement of the sun gear 67 since the ring gear 65 is stationary. These motions are shown in the upper portion of Fig. 5 by the arrows indicated on the respective parts.

With the sun gear 67 being rotated clockwise, the planet gears 71 and 72 will be rotated in a counterclockwise direction so that with ring gear 70 stationary, the radial extension 79 will be rotated in a clockwise direction with the shaft 38 moving clockwise, as viewed in Fig. 2, so that the member 37 moves downwardly away from the viewer with the result that the inlet valve 32 is opened to allow air under pressure to be supplied to the air springs until the chassis 10 raises to a predetermined clearance height relative to the axle 11. When the load within the vehicle decreases with the chassis 10 moving upwardly away from the axle 11, the reverse action takes place with the result that exhaust valve 35 is opened until the decreased pressure in the air springs 12 restores the chassis 10 to its predetermined clearance height relative to the axle 11.

From the foregoing description it will be seen that oscillations of the actuating shaft 51 will be transmitted to the valve operating shaft 38 with the shafts 38 and 51 moving equivalent distances in their oscillatory movements, the planetary gear system providing a direct one-to-one drive from the shaft 51 to the shaft 38.

The control valve as heretofore described will establish and maintain one predetermined clearance height between the sprung mass and the unsprung mass of the vehicle. Under this one condition, which can be established, for example, as the normally maintained clearance height between the sprung mass and the unsprung mass, the actuating shaft 51 has a radius line that has a predetermined angular relationship relative to a radius line of the shaft 38. Thus, under this pre-established and assumed operation condition, the radius line of the shaft 51 can be assumed to be parallel with the radius line of the shaft 38, the radius lines of the shafts thus being aligned in a common plane. Under this condition, the shaft 38 therefore operates as an extension of the actuating shaft 51, the plane of the radius lines of the shafts being established with the control valve in normal neutral static condition. It will be apparent that during operation of the control valve, the radius line of the shaft 51 will move relative to the corresponding radius line of the shaft 38 because of the greater oscillation of shaft 51 so that the angular relationship between the radius lines shall be established when the control valve is in neutral position and static.

The control valve of this invention is also capable of having the operating characteristic changed so that it will establish and maintain thereafter a second predetermined clearance height, for example, one that is higher than the normally established clearance height.

To obtain this above-normal clearance height, the planetary gear system 50 is adapted to be actuated to change the angular relationship between the aforementioned radius line of the shaft 51 and the aforementioned radius line of shaft 38 thereby establishing a new angular relationship between the actuating arm 20a and the valve control member 37 which changes the effective opening and closing of inlet and exhaust valves 32 and 35 relative to the position of the arm 20a whereby to establish a new and different clearance height between the sprung mass and the unsprung mass of the vehicle.

To actuate the planetary gear system 50 to produce the aforementioned change of operating conditions of the control valve, a fluid actuated diaphragm 90 (see Figs. 3 and 4), is placed within the chamber 91 so that the chamber portion 91a can receive fluid under pressure through the inlet port 92 that connects with the supply line 21 which, in turn, is under control of the operator controlled valve 22. The diaphragm 90 rests upon the enlarged head 93 on the end of the stud 82.

Thus, when fluid under pressure is supplied into chamber 91a, the stud member 82 is moved forwardly (as viewed in Figs. 4 and 5) to rotate the ring gear 70 in a clockwise direction shown by the dotted arrow on the member 70 in Fig. 5. Assuming all conditions of the control valve to be static and the valve to be in its neutral position with the chassis 10 being maintained at the first pre-established clearance height above the axle 11, when the operator of the vehicle effects clockwise rotation of the ring gear 70 in the aforementioned manner the planet gears 71 and 73 will be rotated about the then stationary sun gear 67 by the ring gear 70 in a clockwise direction, as indicated by the dotted arrows in Fig. 5, to rotate the valve operating shaft 38 in a clockwise direction.

This rotation of shaft 38 moves the valve control member 37 downwardly from the viewer, with reference to Fig. 2, whereby to open the inlet valve 32 to admit air under pressure to the air springs 12. Air under pressure will be supplied to the air springs 12 until the chassis 10 of the vehicle moves upwardly a sufficient distance to effect rotation of the shaft 38 sufficiently to allow the inlet valve 32 to close.

This operation was brought about by the change in angular relationship between the radius line of shaft 51 and the radius line of shaft 38, the new angular relationship establishing a new set of operating conditions between the actuating arm 20a and the valve control member 37. As soon as the raising of the chassis of the vehicle to the new clearance height has returned the valve control member to its neutral position, that is when neither inlet nor exhaust valves are open, the control valve will thereafter maintain the chassis of the vehicle at the newly established clearance height.

Whenever the operator of the vehicle desires to return it to the normal and lower clearance height, valve 22 can be operated to exhaust fluid from the chamber 91a (see Fig. 4), so that the compression spring 80 will return the ring gear 70 and its operating extension 75 to the position shown in Fig. 4 at which the control valve will again operate to maintain the lower clearance height.

While the control valve of this invention has been illustrated as incorporating two planet systems 50a and 50b to obtain a one-to-one drive ratio between the actuating shaft 51 and the valve operating shaft 38, it will be appreciated that one of the planet systems can be eliminated, preferably planet system 50a with the sun gear 67 being fixedly secured to the shaft extension 68 with the single planet system 60b therefore being effective. Such an arrangement will provide for a differential of movement between the shaft 51 and the shaft 58, but such differential of movement can be compensated by the movement allowed the member 37 between the adjustable stops 53 and 54.

While the embodiments of the present invention as herein disclosed constitute a preferred form, it is to be understood that other forms might be adopted.

What is claimed is as follows:

1. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means operated by a change in clearance height between the sprung mass and the unsprung mass of a vehicle to actuate said valve operating means, and a planetary gear system between said actuating means and said valve operating means to effect transfer of movement thereby of the actuating means to the valve operating means, and means connected to said planetary gear system to actuate the same to change thereby the spatial relationship between the valve operating means and the actuating means whereby to change the operating characteristics of the control valve in establishing and maintaining predetermined clearance height between the sprung mass and the unsprung mass of a vehicle.

2. A height control valve or leveling value for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means operated by a change in clearance height between the sprung mass an the unsprung mass of a vehicle to actuate said valve operating means, and a planetary gear system between said actuating means and said valve operating means to effect transfer of movement thereby of the actuating means to the valve operating means, and means connected to planetary gear system to actuate the same between predetermined preestablished limits to change the angular relationship between said valve operating means and said actuating means selectively between predetermined established angular relationships whereby to establish and maintain predetermined clearance heights of different value between the sprung mass and the unsprung mass of the vehicle according to the selected angular relationship between the valve operating means and the actuating means.

3. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from a fluid suspension means, valve operating means connected with said inlet and exhaust valve means to operate the same, actuating means operated by a change in clearance height between the sprung mass and the unsprung mass of a vehicle to actuate said valve operating means, a planetary gear system between said actuating means and said valve operating means to effect transfer of movement thereby of the actuating means to the valve operating means, said actuating means having a first angular relationship relative to said valve operating means to establish and maintain thereby a first predetermined clearance height between the sprung mass and the unsprung mass of the vehicle, and means under control of the operator of the vehicle to actuate said planetary gear system to establish thereby a second angular relationship between said actuating means and said valve operating means to establish and maintain a second predetermined clearance height between the sprung mass and the unsprung mass of the vehicle.

4. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from the fluid suspension means, valve operating means including an oscillatable shaft connected with said inlet and exhaust valve means to operate the same, actuating means including an oscillatable shaft operated by a change in clearance height between the sprung mass and the unsprung mass of a vehicle to actuate said valve operating means, a planetary gear system operably connecting the shaft of said actuating means with the shaft of said valve operating means to effect transfer of movement thereby of the oscillating actuating shaft to the oscillatable valve operating shaft, said actuating shaft having a radius line in a first angular relationship relative to a radius line of said valve operating shaft to establish and maintain thereby a first predetermined clearance height between the sprung mass and the unsprung mass of the vehicle, and means operating on said planetary gear system to change thereby the angular relationship between the said radius lines of the said shafts to change the operating characteristics of the control valve to establish and maintain thereby a second predetermined clearance height of different value between the sprung mass and the unsprung mass of the vehcle.

5. A height control valve or leveling valve for use in a fluid suspension system of a vehicle to maintain multiple positions of predetermined clearance height of different value between the sprung mass and the unsprung mass of a vehicle, comprising, control valve means having inlet and exhaust valve means for controlling flow of fluid to and from the fluid suspension means, valve operating means including an oscillatable shaft connected with said inlet and exhaust valve means to operate the same, actuating means including an oscillatable shaft operated by a change in clearance height between the sprung mass and the unsprung mass of a vehicle to actuate said valve operating means, a planetary gear system including a sun gear engaging planet gear means which, in turn, is engaged by ring gear means operably connecting the shaft of said actuating means with the shaft of said valve operating means to effect transfer of movement thereby of the oscillating actuating shaft to the oscillatable valve operating shaft, said actuating shaft having a radius line in a first angular relationship relative to a radius line of said valve operating shaft to establish and maintain thereby a first predetermined clearance height between the sprung mass and the unsprung mass of the vehicle, and means operating on the said ring gear of the said planetary gear system to change thereby the angular relationship between the said radius lines of the said shafts to change the operating characteristics of the control valve to establish and maintain thereby a second predetermined clearance height of different value between the sprung mass and the unsprung mass of the vehicle.

6. A height control valve constructed and arranged in accordance with claim 5 wherein the shaft of said valve operating means is operably connected with the said planet gear means of said planetary gear system and a ring gear means in engagement with the said planet gear means to rotate the said planet gear means on rotation of the said ring gear means to change the angular relationship between the said radius lines of the said shafts selectively between the said predetermined angular positions of the said radials whereby to select the predetermined clearance height to be maintained between the sprung mass and the unsprung mass of the vehicle.

7. A height control valve constructed and arranged in accordance with claim 6 that includes fluid actuated means operably connected with said ring gear means of said planetary gear system to actuate said ring gear means when said fluid actuated means is rendered active under control of the operator of the vehicle.

8. A height control valve constructed and arranged in accordance with claim 2 wherein the said planetary gear system comprises first and second planet systems with the sun gear of the systems being common to the planet gear means of both systems to effect in said valve operating means movement equivalent to the movement of the said actuating means.

9. A height control valve constructed and arranged in accordance with claim 4 wherein the said planetary gear system comprises a first planet system with the planet gear means connected to the said actuating shaft and a second planet system with the planet gear means thereof connected to said valve operating shaft and the sun gear means for the planet systems being common to both systems to effect in said valve operating shaft movement equivalent to that of said actuating shaft.

10. A height control valve constructed and arranged in accordance with claim 9 wherein the ring gear means of the planet system connected with said actuating shaft is a stationary member and the ring gear means of the planet system connected with said valve operating shaft is a rotatable member to effect rotation of the planet gear means of the planet system connected with said valve operating shaft to change thereby the angular relationship between the said radials of the said shafts.

References Cited in the file of this patent

UNITED STATES PATENTS

| | | |
|---|---|---|
| 1,784,094 | Fletcher | Dec. 9, 1930 |
| 2,025,244 | Morehead | Dec. 24, 1935 |
| 2,733,931 | Reid | Feb. 7, 1956 |